United States Patent Office 3,147,309
Patented Sept. 1, 1964

3,147,309
PREPARATION OF AMINE-BORANES
Herbert Jenkner, Hannover-Wulfel, Germany, assignor to Kali-Chemie Aktiengesellschaft, Hannover, Germany
No Drawing. Filed Sept. 14, 1961, Ser. No. 137,989
Claims priority, application Germany Sept. 15, 1960
7 Claims. (Cl. 260—583)

The invention relates to the preparation of amine-boranes.

Such compounds, such as N-triethylborazan, have been prepared from triethylamine, triethylborane, and hydrogen at high pressures and high temperatures. Thereby, the ethyl of the triethylborane forms with hydrogen ethane. Said known process is complicated, and the obtained N-triethylborazan is expensive.

I have found that amine-boranes may be prepared in a simple procedure without splitting off paraffins by reacting boric acid esters and organic amines with silicon-hydrogen compounds. Silicic acid esters are obtained as commercially useful by-products.

The reaction proceeds according to the equation

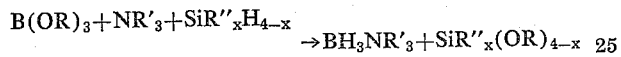
$$B(OR)_3 + NR'_3 + SiR''_xH_{4-x} \rightarrow BH_3NR'_3 + SiR''_x(OR)_{4-x}$$

wherein R, R', R'' define the same or different hydrocarbon radicals such as alkyl like methyl, ethyl, propyl, butyl, decyl and higher alkyls, aryl, substituted alkyl, cycloalkyl. In addition, one or two R' may be hydrogen, and R'' may be OR or halogen. x is an integer between 0 and 3.

Instead of orthoboric acid esters, I may use polyboric acid esters (boroxoles); for economic reasons, I prefer to use the boric acid methyl ester which is commercially available in large amounts.

Any desired amine-borane can be prepared by using the corresponding amine $NR'_3$. If tertiary amines are used, borazans of the general formula $R'_3N \cdot BH_3$ are obtained; with secondary amines, borazenes are obtained in addition to borazans as compounds of the formula $R'_2HN \cdot BH_3$ partially decompose to borazenes, by splitting off hydrogen. With primary amines, borazines are produced. Particularly suitable for the reaction are organic secondary and tertiary amines; examples are trialkyl amines, such as trimethylamine, triethylamine, tripropylamine, diethylpropylamine, tributylamine, benzyldimethylamine, pyridine, N-alkyl derivatives of morpholine such as N-methylmorpholine, suitable secondary amines are dibutylamine and similar aliphatic amines, morpholine, and others. All amines can be used which are temperature-resistant under the conditions of the reaction.

Suitable silicon-hydrogen compounds are all compounds which contain at least one Si—H bond, particularly monosilane and organosilanes containing organic radicals. Particularly suitable are trimethylsilane, dimethylsilane, triethylsilane, diethylsilane, dimethylethylsilane, phenyl silanes, methylhydrogen polysiloxanes, also alkoxy silanes such as triethoxysilane; I may also use partially halogenated silanes such as dichlorosilane and silicochloroform, but I prefer halogen free silanes.

The R or OR groups linked to boron, silicon, or nitrogen may be the same or different ones. As an example, triethylamine, diethylpropylsilane, and boric acid methyl ester may be reacted. The principle of preparing amine-boranes from silicon-hydrogen compounds and boric acid esters in the presence of amines being disclosed, the skilled in the art can easily select the combination most suitable for his purposes.

Generally, stoichiometric amounts will be reacted. However, it is also possible to use an excess of any of the reactants.

Often, it is useful, though not necessary, to operate at elevated pressures. This is particularly of advantage when volatile silicon-hydrogen compounds and/or boric acid esters and/or amines are used in the reaction. The best reaction temperature is between 100 and 250° C.; it may, however, be somewhat lower or higher. In view of the sensitivity of the reactants to oxygen and water, the reaction should be carried out with exclusion of air and moisture. The silicic ester obtained as a by-product is in most cases readily distilled off from the amine-borane.

If desired, the reaction may be carried out in the presence of solvents or diluents. Suitable solvents are those which, under the conditions of the reaction, react neither with the starting materials nor with the end products. Examples are aliphatic hydrocarbons which are free of unsaturation, paraffin oils, aromatic hydrocarbons, and the like. As a suitable inert diluent, an excess of the silicon-hydrogen compound employed or of a silicic ester may be used, provided those compounds are liquids.

The amine-boranes are useful as reducing agents and as polymerization catalysts. They may be used essentially as substitutes for borohydrides because they are less toxic and are, therefore, easier to manipulate.

The following examples are given to illustrate the invention. All examples were carried out with exclusion of air and moisture. All parts are given by weight unless indicated otherwise.

*Example 1*

A mixture of 41 parts of methyl borate and 41 parts of triethylamine was placed in a 250 cc. pressure vessel, and monosilane was forced into said mixture until a pressure of 61 atm. was obtained. Then the temperature was raised to slightly above 150° C., and the vessel was shaken at said temperature for 5 hours. The vessel was cooled to room temperature, and the formed silicic ester was distilled off. Finally, 41 parts of N-triethylborazan were obtained by distillation, corresponding to a yield of 91% of theory, calculated on boric acid ester.

*Example 2*

A mixture consisting of 20.8 parts of methyl borate, 30 parts of diethylsilane, and 20.2 parts of triethylamine were placed into a reaction vessel and heated for 4 hours at 180–190° C. After cooling, a waterclear liquid was obtained which was distilled in vacuo. There were obtained 19.1 parts of N-triethylborazan, corresponding to more than 90% of theory, calculated on the methyl borate.

*Example 3*

According to the equation

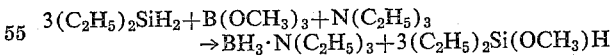
$$3(C_2H_5)_2SiH_2 + B(OCH_3)_3 + N(C_2H_5)_3 \rightarrow BH_3 \cdot N(C_2H_5)_3 + 3(C_2H_5)_2Si(OCH_3)H$$

21 parts of methyl borate, 53 parts of diethylsilane, and 19 parts of triethylamine were reacted as set forth in Example 2. There were obtained 21.2 parts of N-triethylborazan, corresponding to 98% of theory, calculated on triethylamine.

This example shows that quantitative yields are obtained when an excess of the reacting silicon-hydrogen compounds is used, which excess serves as a solvent or diluent.

I claim:

1. A method for the preparation of amine-boranes comprising reacting, with the exclusion of air and moisture, a lower alkyl ester of boric acid and an amine selected from the group consisting of pyridine, morpholine, lower N-alkyl derivatives of morpholine, and amines of the formula $NR'_3$ wherein R' is lower alkyl, with a member of the group consisting of monosilane and lower alkyl and alkoxysubstituted silanes.

2. The method as claimed in claim 1 wherein 1 to 2 of said R' groups are replaced by hydrogen.

3. The method as claimed in claim 1 wherein the reaction is carried out at a temperature between about 100 and 250° C.

4. The method as claimed in claim 1 wherein the reaction is carried out in the presence of an excess of one of the liquid reactants acting as diluent.

5. The method as claimed in claim 1 wherein the reaction is carried out at elevated pressure.

6. A method for the preparation of N-triethylborazan comprising reacting at a temperature of about 100 to 250° C. under pressure monosilane with methyl borate and triethylamine with exclusion of air and moisture.

7. A method for the preparation of N-triethylborazan comprising reacting at a temperature of about 100 to 250° C. under pressure lower alkyl silane with methyl borate and triethylamine with exclusion of air and moisture.

References Cited in the file of this patent

FOREIGN PATENTS 1,218,698     France _____ May 12, 1960

OTHER REFERENCES

Morton: The Chemistry of Heterocyclic Compounds, p. vi of the preface, N.Y., McGraw-Hill, 1946.